(No Model.)
E. U. THOMPSON.
ATTACHMENT FOR COFFEE AND TEA POTS.
No. 415,372. Patented Nov. 19, 1889.
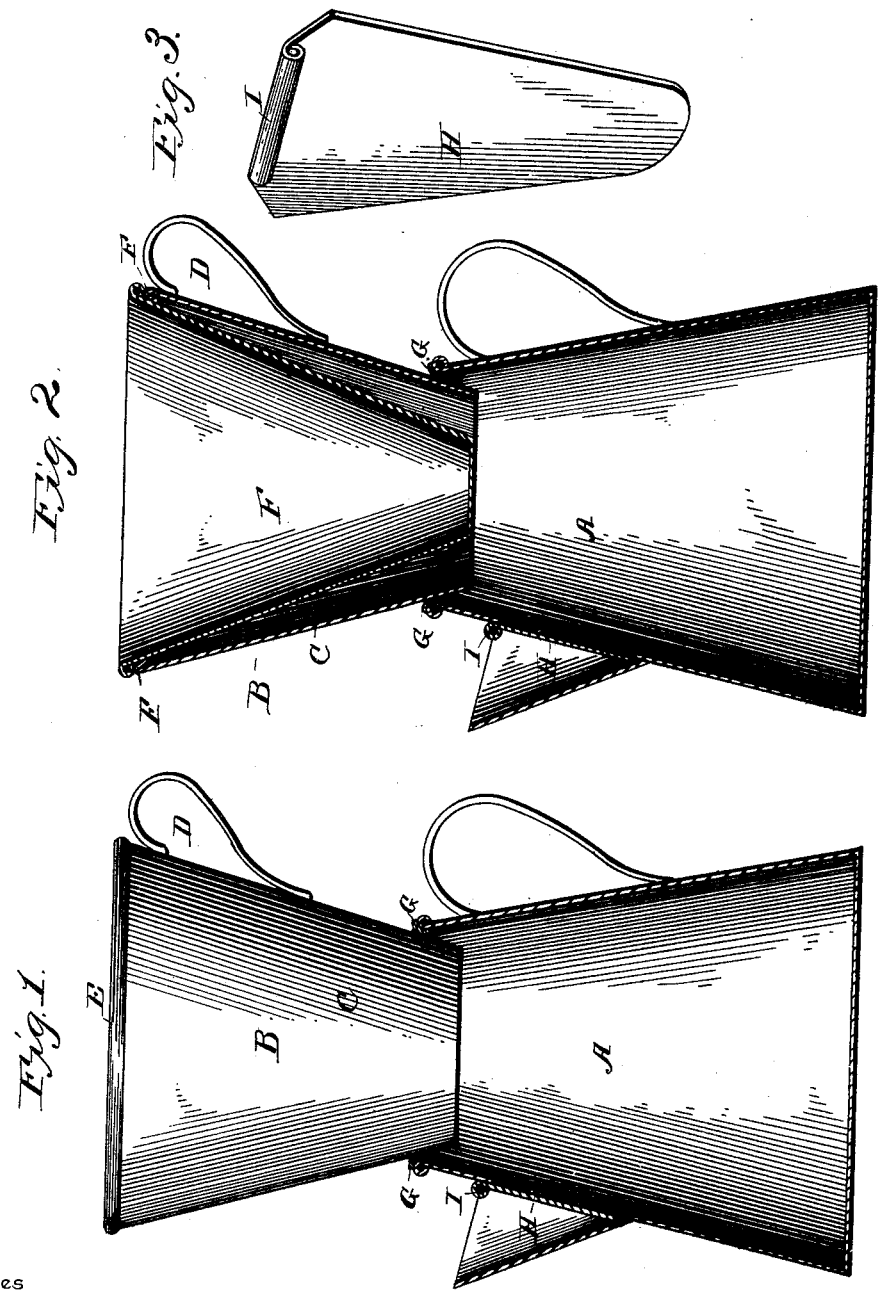
Witnesses
E. C. Wurdeman
E. G. Siggers
Inventor
Ephraim U. Thompson
By his Attorneys,
C. A. Snow & Co.

UNITED STATES PATENT OFFICE.

EPHRAIM U. THOMPSON, OF THOMASTON, MAINE.

ATTACHMENT FOR COFFEE AND TEA POTS.

SPECIFICATION forming part of Letters Patent No. 415,372, dated November 19, 1889.

Application filed June 11, 1889. Serial No. 313,868. (No model.)

*To all whom it may concern:*

Be it known that I, EPHRAIM U. THOMPSON, a citizen of the United States, residing at Thomaston, in the county of Lincoln and State of Maine, have invented a new and useful Attachment for Coffee and Tea Pots, of which the following is a specification.

My invention is an improved attachment for coffee and tea pots; and it consists of certain novel features hereinafter claimed and particularly pointed out in the claim.

In the accompanying drawings, Figure 1 is a view showing the coffee-pot in vertical section and my improved attachment in side elevation in position therein. Fig. 2 is a similar view showing my attachment in vertical section, and Fig. 3 is a detail perspective view of the cap or plate which is used to close the spout of the pot.

Referring to the drawings by letter, A designates a coffee-pot of the usual or any preferred form, and B represents my improved attachment in position therein.

My said attachment consists of an outer shell C of an inverted conical form having an open lower end and provided with a handle D near its upper end. To the upper end of this shell C, I secure an inner shell E, which is tapered more sharply than the outer shell and has a closed lower end, as clearly shown. The two shells are permanently secured together at their upper ends and provided with a packing F, of any suitable material, so as to form a steam-tight joint. The outer shell is also provided with an external collar G, of rubber or some similar elastic material, which forms a water-tight joint between the casing of the pot and the outer shell when the attachment is in position.

The attachment further comprises a metallic plate H, which is substantially triangular in shape and is provided at its wider end with a lip I, which serves as a handle.

In practice, when it is desired to use my attachment, the plate H is slipped down in the spout of the coffee or tea pot, so as to cover the discharge-openings therein and thereby prevent the escape of steam through the same. The condensing device, formed by the two inverted conical shells, is then placed in the upper end of the pot and supported thereby. The inner shell is filled either wholly or partially with cold water, and the device is then ready for use, the proper amount of coffee and water having been previously placed in the pot. As the water in the coffee-pot boils and is converted into steam the steam will rise and pass into the space between the two shells and will be condensed by its contact with the inner shell and will then pass back into the coffee-pot. The desired beverage will thus be quickly produced.

From the foregoing description, taken in connection with the accompanying drawings, it will be seen that I have provided an attachment for coffee and tea pots which is very simple in its construction and by the use of which a high grade of coffee or tea will be produced. The inner shell, being filled with cold water, will be kept cool, so as to condense the steam rising against the same, and this condensed steam will fall back into the coffee-pot, so as to retain the full strength of the coffee, instead of escaping through the top of the coffee-pot and so carrying off the flavor and strength of the coffee, as in the ordinary coffee-pots.

Having thus described my invention, what I claim, and desire to secure by Letters Patent, is—

A condensing device for coffee and tea pots, consisting of an outer conical or funnel-shaped shell open at its lower end, an inner conical vessel connected at its upper edge to the upper edge of said outer shell, and an elastic gasket or band surrounding the said outer shell and adapted to be adjusted upon the latter and to form a steam-tight joint with the vessel upon which it may be placed, substantially as set forth.

In testimony that I claim the foregoing as my own I have hereto affixed my signature in presence of two witnesses.

EPHRAIM U. THOMPSON.

Witnesses:
C. S. SMITH,
J. C. LEVENSALER.